(12) United States Patent
Blaettermann et al.

(10) Patent No.: US 7,245,773 B2
(45) Date of Patent: Jul. 17, 2007

(54) METHOD AND SYSTEM FOR CODING OR DECODING OF A SERIES OF IMAGES

(75) Inventors: Gabi Blaettermann, Berlin (DE); Detlev Marpe, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 704 days.

(21) Appl. No.: 10/275,837

(22) PCT Filed: May 3, 2001

(86) PCT No.: PCT/DE01/01688

§ 371 (c)(1),
(2), (4) Date: Nov. 6, 2002

(87) PCT Pub. No.: WO01/86958

PCT Pub. Date: Nov. 15, 2001

(65) Prior Publication Data

US 2003/0142869 A1 Jul. 31, 2003

(30) Foreign Application Priority Data

May 8, 2000 (DE) ................. 100 22 262

(51) Int. Cl.
*G06K 9/36* (2006.01)
(52) U.S. Cl. .................. 382/236; 382/232
(58) Field of Classification Search ........ 382/232, 382/236, 240, 251; 375/240.11, 240.25
See application file for complete search history.

(56) References Cited

U.S. PATENT DOCUMENTS

| | | | |
|---|---|---|---|
| 5,408,270 A * | 4/1995 | Lim | 375/240.25 |
| 5,706,220 A | 1/1998 | Vafai et al. | 708/308 |
| 5,764,802 A | 6/1998 | Simon | 382/236 |
| 5,838,377 A | 11/1998 | Greene | 375/240.11 |
| 5,923,785 A | 7/1999 | Dube | 382/240 |
| 5,995,150 A | 11/1999 | Hasan et al. | 375/240.12 |
| 6,055,017 A | 4/2000 | Shen et al. | 375/240.11 |

FOREIGN PATENT DOCUMENTS

| | | |
|---|---|---|
| DE | 197 34 542 | 2/1999 |
| EP | 0 441 168 | 8/1991 |
| GB | 2 341 034 | 3/2000 |
| GB | 2 341 035 | 3/2000 |

(Continued)

OTHER PUBLICATIONS

Bosveld et al., "Performance Evaluation of Hierarchical Coding Schemes for HDTV" Signal Processing Theories and Applications, Barcelona, 9-18/21-90, pp. 801-804.

(Continued)

*Primary Examiner*—Duy M. Dang
(74) *Attorney, Agent, or Firm*—Bell, Boyd & Lloyd LLP

(57) ABSTRACT

A method and system are provided for coding or decoding a series of images, wherein base information is determined using a method for source coding, with residual error information being produced during the source coding between the series of images and a coded series of images, the additional information is generated for the gradual display of residual error information, in that the residual error information is subdivided into frequency ranges and gradually scaled, and the series of images is coded using the base information and the additional information, with the additional information guaranteeing a progressive improvement in the coding quality.

18 Claims, 8 Drawing Sheets

FOREIGN PATENT DOCUMENTS

| | | |
|---|---|---|
| WO | WO 98/40842 | 9/1998 |
| WO | WO 98/53613 | 11/1998 |
| WO | WO 00/05898 | 2/2000 |

OTHER PUBLICATIONS

Patent Abstracts of Japan—2001307940—Nov. 2, 2001.

"Digital Image Compression Techniques" Rabbani et al. vol. TT 7.

Digitale Fernsehtechnik—Ulrich Reimers.

SPIE vol. 1001 Visual Communications and Image Processing '88—"Displacement estimation by hierarchical blockmatching" Bierling, pp. 942-951.

Fernseh und Kino Technik 48, Jahrgang Nr. Mar. 1994—MPEG-2-Bildcodierung fur das digitale Fernsehen, De Lameillieure et al, pp. 99-107.

\* cited by examiner

METHOD AND SYSTEM FOR CODING OR DECODING OF A SERIES OF IMAGES

BACKGROUND OF THE INVENTION

A method for image compression with an associated arrangement is known from [1]. The known method serves in the MPEG (Motion Picture Expert Group) standard as a coding method and is substantially based on the hybrid DCT (Discrete Cosine Transform) with motion compensation. A similar method is used for video telephony using n×64 kbit/s (CCITT Recommendation H.261), for the TV contribution (CCR Recommendation 723) using 34 or 45 Mbits/s and for multimedia applications using 1.2 Mbit/s (ISO-MPEG-1). The hybrid DCT consists of a chronological processing stage that utilizes the kinship relations between successive images and a local processing stage that utilizes the correlation within an image.

The local processing (intraframe coding) basically corresponds to the conventional DCT coding. The image is broken down into blocks of 8×8 pixels that, in each case, are transformed to the frequency range via DCT. The result is a matrix of 8×8 coefficients that approximately reflects the two-dimensional local frequencies in the transformed image block. A coefficient with frequency 0 (direct component) represents a mean gray value of the image block.

Data expansion takes place after the transformation. Of course, a concentration of energy around the direct component (DC value) takes place in natural image masters, while the highest-frequency coefficients are mainly almost zero.

A spectral weighting of the coefficients takes place in the next stage, so that the amplitude accuracy of the high-frequency coefficients is reduced. This utilizes the properties of the human eye to resolve high local frequencies less accurately than low local frequencies.

A second stage in data reduction takes place in the form of an adaptive quantizing, via which the amplitude accuracy of the coefficient is further reduced or via which the small amplitudes are set to zero. The magnitude of the quantizing depends, in this case, on the occupancy of the output buffer. If the buffer is empty, a fine quantizing takes place and more data is generated. Conversely, the quantizing is coarser with a full buffer, which reduces the amount of data.

After the quantizing, the block is subject to zigzag scanning, which is followed by entropy coding, which further reduces the data. Two effects are used for this purpose.
1.) The statistics of the amplitude values (high amplitude values occur less frequently than small ones, so that long code words are allocated to the less-frequent events and short code words to the more-frequent events (variable-length coding (VLC)). In this way, a lower data rate is achieved on average than when coding using a fixed word length. The variable rate of the VLC is then smoothed in the buffer memory.
2.) The fact that in most cases only zeros follow from a specific value is utilized. Instead of all of these zeros, only an EOB (End Of Block) code is transmitted, which leads to a significant coding gain when compressing the image data. Instead of the initial rate of, for example, 512 bit, only 46 bit is then to be transmitted for this block, which corresponds to a compression factor of more than 11.

A further compression gain is obtained by chronological processing (interframe coding). To code differential images requires a lower data rate than for the original images, because the amplitude values are far lower.

Of course, the time differences are only small if the motions in the picture are also slight. If, on the other hand, the motions in the image are great, large differences occur which, in turn, are difficult to code. For this reason, the image-to-image motion is measured (motion estimation) and compensated for before forming the differential (motion compensation). In this case, the motion information is transmitted with the image information with only one motion vector per macroblock (e.g., four 8×8 image blocks) normally being used.

Yet further amplitude values of the differential images are obtained if a motion-compensated bidirectional prediction is utilized instead of the applied prediction.

In the case of a motion-compensated hybrid coder, the image signal itself is not transformed, but instead the chronological differential signal. For this reason, the coder also has a chronological recursive loop because the predictor must calculate the prediction value from the values of the already-transmitted (coded) images. An identical chronological recursive loop is located in the decoder so that the coder and decoder are fully synchronized.

In the MPEG-2 coding method there are mainly three different ways in which the images can be processed. These are as follows.

I-Images: No chronological prediction is used for the I-images; i.e., the image values are directly transformed and coded. I-images are used to be able to begin the decoding process again without knowledge of the past chronology, or to achieve a resynchronization during transmission errors.

P-Images: A chronological prediction is carried out using the P-images, with the DCT being applied to the chronological prediction error.

B-Images: With the B-images the chronological bidirectional prediction error is calculated and then transformed. The operation of the bidirectional prediction is basically adaptive; i.e., a forward prediction, a rearward prediction or an interpolation is permitted.

With the MPEG-2 coding, an image series is divided into so-called GOPs (Groups Of Pictures). n images from one I-image to the next form a GOP. The distance between the P-images is designated by m, with m−1 B-images being located, in each case, between the P-images. The MPEG syntax allows the user to decide how m and n are selected. m=1 means that no B-images are used and n=1 means that only I-images are coded.

A method for estimating motion as part of a method of block-based image coding is known from [2]. A precondition for this is that a digitized image has pixels that are assembled in image blocks of, in particular, 8×8 pixels or 16×16 pixels. If necessary, an image block also may include several image blocks. An example of this is a macroblock with six image blocks of which four image blocks are provided for luminosity information and two image block for color information.

Where there is a series of images, the following procedure is adopted for an image to be coded, taking account of the image blocks of this image.

A value for an error dimension is determined for the image block for which a motion estimation is to be made, in a chronologically preceding image starting from an image block that was in the same relative position in the preceding image (preceding image block). To do this, a total of the amounts of the differences between the coding information of the image block allocated to the pixels and of the preceding image block is preferably determined.

Coding information in this case is luminosity information (luminance value) and/or color information (chrominance value) which, in each case, is allocated to a pixel.

In a search area of presettable size and shape around the starting position in the chronologically preceding image, a value of the error dimension is determined, in each case, for an area of the same size as the preceding image block displaced by one or a half pixel.

In a search area of n×n pixels size $n^2$ (error) values result. The particular displaced previous image block in the chronologically preceding image, for which the error dimension produces a minimum error value, is determined. For this image block, it is assumed that this previous image block coincides best with the image block of the image to be coded for which the motion estimation is to be made.

The result of the motion estimation is a motion vector with which the displacement between the image block in the image to be coded and the selected image block in the chronologically preceding image is described.

Compression of the image data is thus achieved in that the motion vector and the error signal are coded.

In particular, the motion estimation is performed for each image block of an image.

An object-based image compression method is based on breaking down the image into objects with any type of margin. The individual objects are coded separate from each other in different video object plans, transmitted and again assembled in a receiver (decoder). As described above, with conventional coding methods the complete image is subdivided into square image blocks. This principle is also adopted in the object-based methods in that the object to be coded is broken down into square blocks and a separate motion estimation with motion compensation is separately performed for each block.

Where a series of images (image data) is transmitted through a disturbed communication channel, particularly a mobile (radio) channel or a wired loss-prone channel, parts of the image data can be lost. A loss of image data of this kind manifests itself in the form of severe reductions in quality in more or less large image areas. Because, as described above, with the image coding/image decoding method the motion estimation with motion compensation is used, the image interference does not disappear even if the transmission channel again guarantees error-free transmission. The reason for this is that, particularly once an error has occurred during the motion estimation, it persists up to transmission of the next full image (intra-image). Therefore, an extremely disturbing error propagation takes place.

Video data compression methods according to known standards (H.261, H.263, MPEG-1/2/4) use a motion-compensated prediction (motion estimation with error correction) and a transformation-based residual error coding with the discrete cosine transform being preferably used as the transformation coding. MPEG-2 contains suggestions for a scaleable coding (hierarchical coding). In this case, an image is subdivided into base information with a preset image quality and additional information that is additionally coded and transmitted to create a complete image quality (adequate image quality). Where there are transmission errors in the area of additional information, it is still ensured that the particular image can be reconstructed to a quality produced by the basic information.

An object of the present invention lies in providing an error-tolerant coding of a series of images, whereby the most efficient utilization possible of the disturbed channel can be achieved with regard to the image quality of the series of images.

SUMMARY OF THE INVENTION

To achieve such object, a method for coding a series of images is stated, whereby base information and additional information are determined for the series of images, using the following steps.

(1) The base information is determined using a method for source coding, with residual error information being produced during the source coding between the series of images and a coded series of images.

(2) The additional information is generated for the gradual display of residual error information, in that the residual error information is subdivided into frequency ranges and gradually scaled.

A series of images is coded using the base information and additional information, with the additional information guaranteeing a progressive improvement in the coding quality.

In this case, it is particularly advantageous that an existing source coder (i.e., particularly a system consisting of transformation, quantizing and entropy coding) guarantees a certain basic quality of the coded series of images. Furthermore, additional information that guarantees a gradual (progressive) quality improvement of the series of images preferably can be transmitted regardless of the remaining bandwidth of a transmission channel. In this case, the additional information is particularly to be transmitted such that with regard to improvement in the quality of the individual image to be coded essential parts of the additional information are first transmitted. Furthermore, it is advantageous that the improvement in the quality of this image takes place uniformly for the image.

A further embodiment consists in that the series of images are transmitted as a bitstream through a channel to a receiver. In particular, the channel can be exposed to interference, with the result that on the channel its actual usable bandwidth is not utilizable during this interference. With regard to this, it should be mentioned that the source coding of the base information is available which was expanded using the additional information (gradual) and transmitted via the channel in the form of a bitstream to the receiver. With regard to the channel, it is significant that this has a bandwidth that varies greatly under certain circumstances depending on interference. Interference can be predicted either only poorly or not at all so that intrusion into the bandwidth of the channel without the additional information being used would mean that the series of images would either not be detectable to the receiver or detectable only in a distinctly reduced quality. In particular, the base information designed also for the error-prone channel guarantees a certain basic quality for a coded series of images, the quality of which can be (gradually) improved using the additional information. If interference occurs on the channel, parts of the additional information are lost, such that in most cases a gradual improvement compared with the image quality guaranteed by the base information still can be ensured. For this purpose, the additional information preferably is prepared so that significant information with regard to a possible improvement of the image is first transmitted via the channel (in the bitstream).

A possible application exists in that also with a stable, or largely undisturbed, transmission channel the series of images can be called up in different qualities by the receiver. The quality scaling takes place in the aforementioned type and manner. A possible area of application is video-on-demand, which is based on the system whereby the user wants to receive a quality specified by him/her and also will pay only for this quality.

The residual error information can be determined using differential images in the image area or in a transformation area. An example of a transformation spanning such a transformation area is the discrete cosine transform (DCT). In this transformation area, the difference between the current transformed image and the chronologically preceding inverse-transformed image in the series of images can be determined. Inverse-transformed in this case refers to dequantizing of the current image taking place after quantizing and thus an image which is loss-prone compared to the current image is received that deviates from the current image by residual error information. If the dequantized image is also subjected to a further inverse transformation, the image with a residual error in the non-transformed image area is received (residual error information in the image area).

A further embodiment exists in that the method for source coding is a standard image coding procedure. In particular, it can be an image coding procedure according to an MPEG standard or an H.26x standard.

An additional further embodiment exists in that the subdivision into frequency ranges is performed such that the additional information for each image in the series of images is transmitted according to its significance.

A further embodiment of the present invention is that over a specified set of values of additional information the most significant bits in each case in the bitstream are iteratively input for all values in this set. This guarantees that firstly the most important bits are transmitted in the bitstream to the receiver. Thus, in turn, if the bitstream breaks off, the information transmitted for the particular image represents the best possible quality for that image. In the iteration loop, a succeeding pass makes sure that a bit following the most significant bit, which is then, in turn, the most significant bit not yet transmitted, is transmitted. If a disturbance now occurs in the channel, it is ensured that for the set of values to be transmitted the most significant ("best") bits were transmitted in each case. The remaining bits then can be filled with zeros for a resolution of the n-bits of the value.

It should be noted here that the scenario described assumes that the series of images is coded by an encoder and transmitted on the described channel to a decoder. The decoder restores the base information and, as far as possible, the additional information and thus presents, in particular, the received series of images.

In this case it is to be ensured that the decoder at the receiver end knows how the additional information is to be dealt with; i.e., the extent to which the additional information is to be processed to achieve an improvement in the image quality provided by the base information. The source coder thus represents a functional base layer which delivers a piece of base information as a result. There is an expansion layer for the base layer that provides an additional service; i.e., an improvement in the image quality for each single, in particular block-coded, image using the additional information. Via this expansion layer, or as part thereof, an application (layer) can be envisaged that produces an explicitly controllable specified quality of images; for example, in the case of the aforementioned video-on-demand application. Thus, a user at the decoder end within the application (layer) can, in advance, make the choice which suits him/her; the associated quality of the images being provided by the base and expansion layer (i.e., using the base and additional information). A selection mode and a billing mode linked to it thus can be provided for the bandwidth used for the video-on-demand application. The customer pays for the bandwidth requested by him/her and the channel is therefore not the bottleneck of the system in this scenario.

Also, it is a further development in that the base information is taken into account when determining the additional information.

In this case, it is particularly advantageous that loss-prone image coding already be carried out in the base information, which provides certain results that can be efficiently included in the determination of the additional information.

In particular, the additional information can be added to the bitstream as part of a postprocessing. One advantage of such postprocessing is that the parts of the additional information which bring about what quality improvements can be identified and thus the most significant parts with regard to quality improvements can be inserted first into the bitstream.

Furthermore, to achieve the objective, a method of decoding a series of images is stated, showing which series of images was coded according to one of the aforementioned methods.

Also to achieve the objective, a system for coding a series of images is stated that has a processor unit, set up such that
a) for the series of images, base information and additional information are determined using the following steps.
  (1) The base information is determined using a method of source coding, with residual error information resulting between the series of images and a coded series of images during the source coding.
  (2) The additional information for gradual representation of the residual error information is created in that the residual error information is divided into frequency ranges and gradually scaled.
b) the series of images is coded using base information and additional information, the additional information guaranteeing a progressive improvement in the coding quality.

Furthermore, to achieve the objective, a system for decoding a series of images with a processor unit is used that is set up such that each image in the series of images can be restored using the base information and the additional information. In particular, this system is a decoder that suitably evaluates base information and additional information. Furthermore, the decoder can demand a certain service represented in the form of different additional information, such as video-on-demand in a specified resolution, which is only achieved by the combination of base information and additional information.

The systems are particularly suitable for carrying out the particular method according to the present invention or one of its further embodiments explained herein.

Additional features and advantages of the present invention are described in, and will be apparent from, the following Detailed Description of the Invention and the Figures.

DETAILED DESCRIPTION OF THE INVENTION

Figure 1:
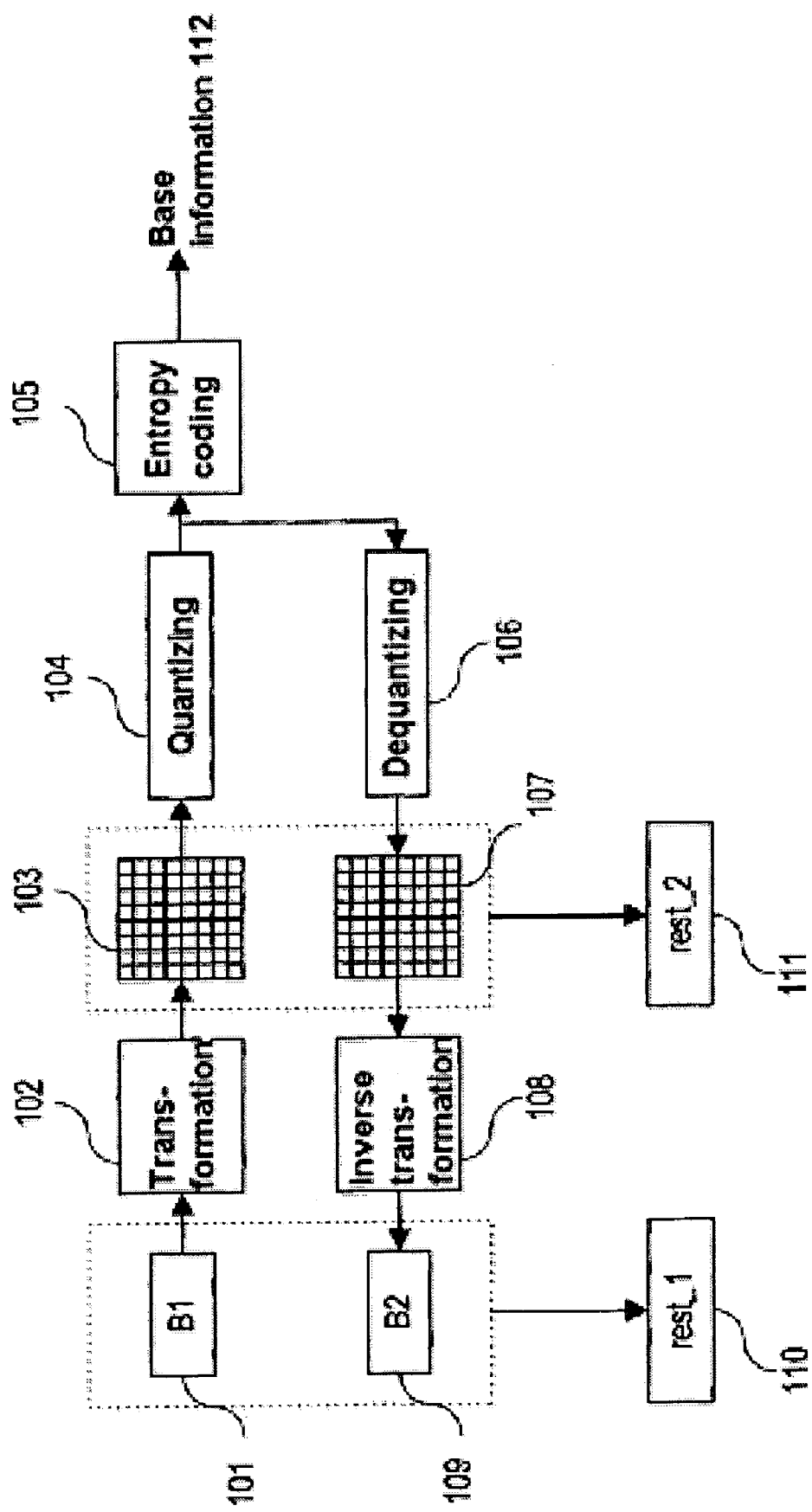
FIG. 1 shows a sketch exemplifying a method of source coding.

FIG. 1 shows a sketch illustrating a method of source coding. A first preferably block-based image B1 101 is subjected to a transformation 102. An example of such a transformation is a discrete cosine transform (DCT). The coefficients of the transformation, shown in block 103, result. In a quantizing 104, image B1 101 is shown loss-prone. An entropy coding 105 supplies the base information 112. The quantized loss-prone image B1 101 is dequantized (see block 106), the associated transformation coefficients 107 result, and an inverse transformation 108 provides a second image B2 109 that has residual error information compared to the first image B1 101; i.e., a reduced image quality. The residual error between both images B1 and B2 is attributable to the quantizing error (see block 104), that is deliberately taken into account, in order to obtain data compression within the base information and to be able to design the base information from the point of view of a poor-quality transmission channel such that transmission is ensured. In particular, there are base channels that have only a small bandwidth and, therefore, a high data reduction is a precondition for the transmission of a series of images.

Furthermore, FIG. 1 shows a first residual error information rest_1 110 and a second residual error information rest_2 111. Both items of residual information are further processed in FIGS. 2 and 3 to generate additional information 206 or 306, respectively. In principle, a complete coding and transmission of residual error information enables a complete reconstruction of image B1 101 using the base information, and the additional information to be generated.

Figure 2:
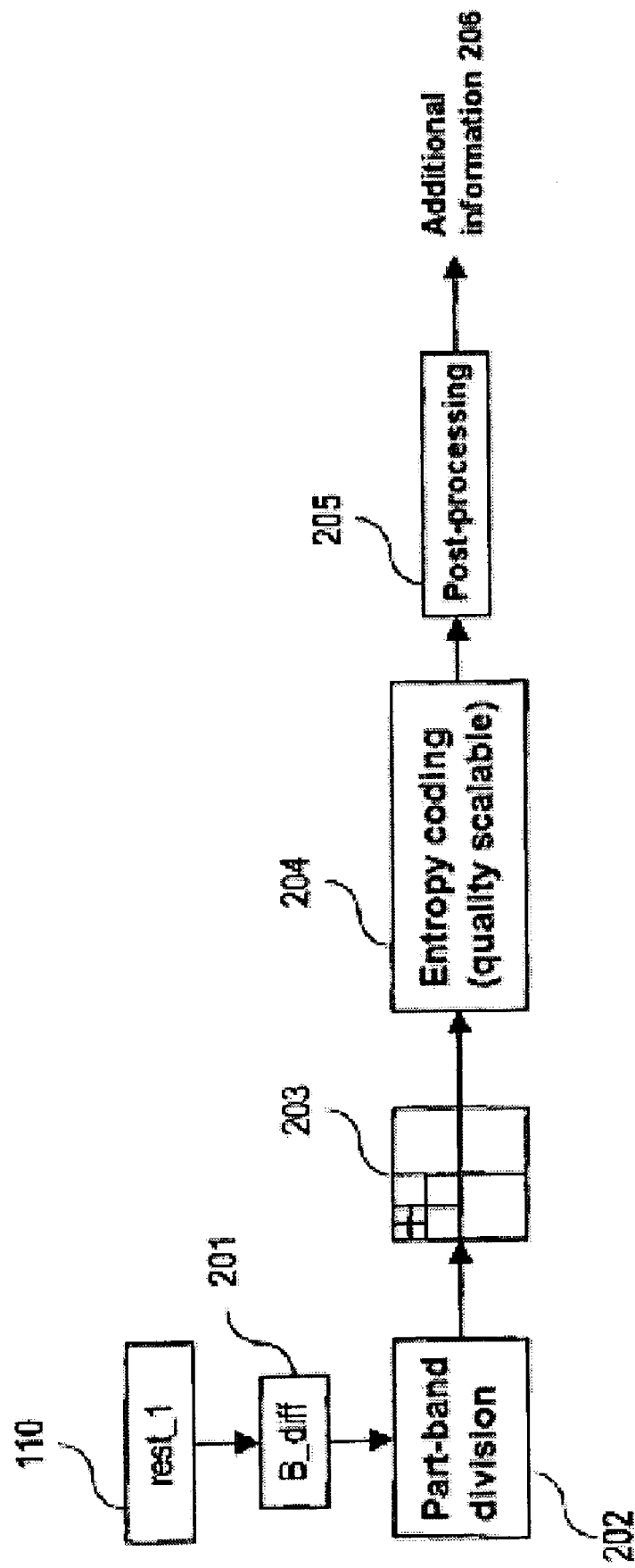
FIG. 2 shows a sketch with a first alternative for determining additional information.

FIG. 2 shows a sketch with a first alternative for determining additional information. The first residual error information rest_1 110, described in FIG. 1, is obtained by using the difference between the first image B1 and the second image B2 1 (see 101 and 109 in FIG. 1). A differential image B_diff 201 therefore results. This differential image B_diff 201 is applied to a part-band division 202. The part band division 202 can, in particular, consist of a wavelet transformation or a wavelet packet transformation. Low-pass and high-pass components or mixtures of low-pass and high-pass components result separately, in each case, for the differential image 201. This filtered information is applied to an entropy coding that preferably is of a quality-scaleable type (see block 204). In block 205, the data is postprocessed with the aim of achieving the greatest possible quality improvement of the coded image B1 consisting only of the base information 112. This is particularly achieved in that the additional information is determined such that initially the greatest improvement is effected with the improvement itself uniformly effecting all the blocks of the coded image if possible. The particular possibilities of postprocessing to achieve this aim are detailed in the following.

Figure 3:
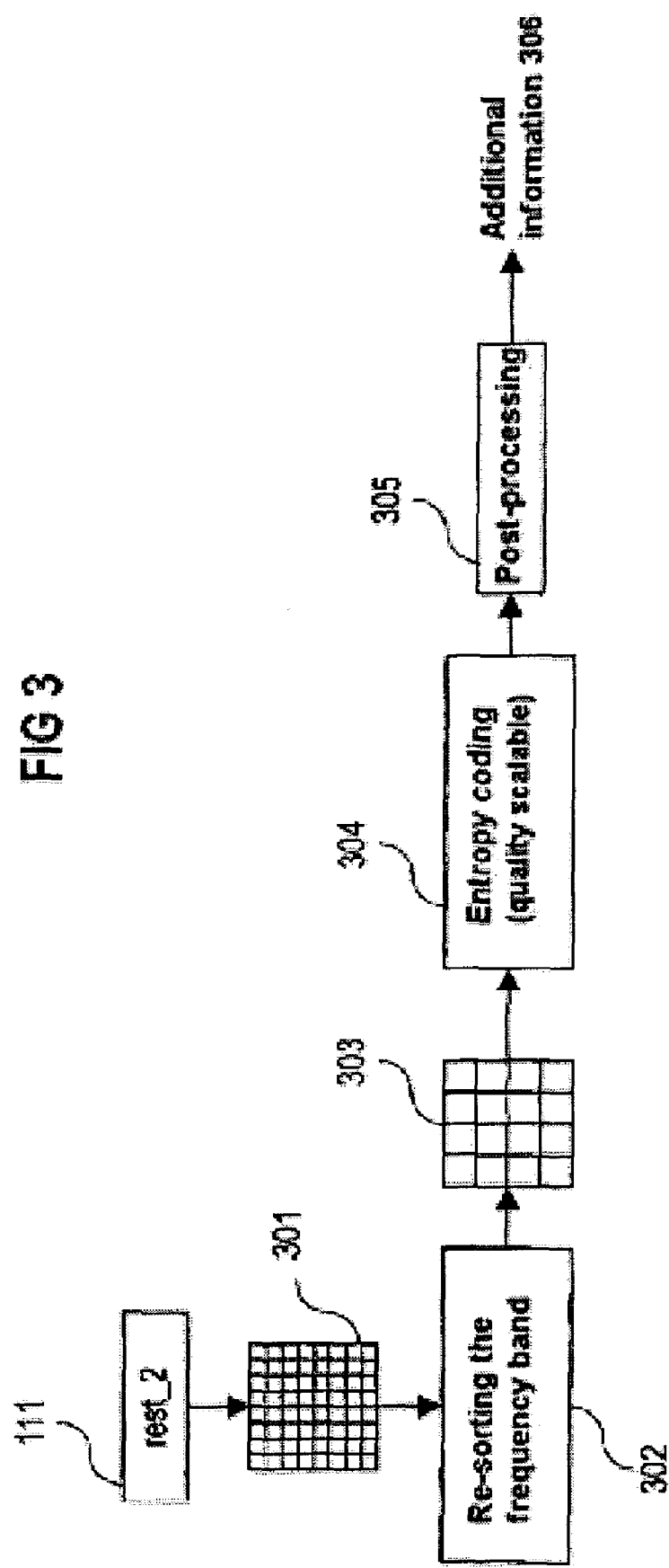
FIG. 3 shows a sketch with a second alternative for determining additional information.

A further alternative for determining the additional information is shown in FIG. 3. By analogy with FIG. 1, the residual error information rest_2 111 is determined from the difference between the first image B1 and the second image B2, in the transformation area in each case (see 103 and 107 in FIG. 1). A differential image 301 is produced in the transformation area, which is shown block-based with certain frequency components being specified for each block. As a result of a DCT transformation, a DC component and a number of AC components are produced. In step 302, a re-sorting of these frequency bands takes place that respectively combines all the DC components or all the AC components of the relevant frequencies. This is shown symbolically by block 303 which contains the same information of coefficients as block 301 with, of course, the coefficients for the relevant frequency ranges or the DC component being combined over all blocks. This mechanism of re-sorting is also explained in FIG. 5. After the re-sorting of the frequency bands, a quality-scaleable entropy coding 304 takes place. A postprocessing 305 then takes place, so that additional information 306 results, which is arranged such that the components significant with regard to quality improvement are transmitted first in the bitstream.

Figure 4:
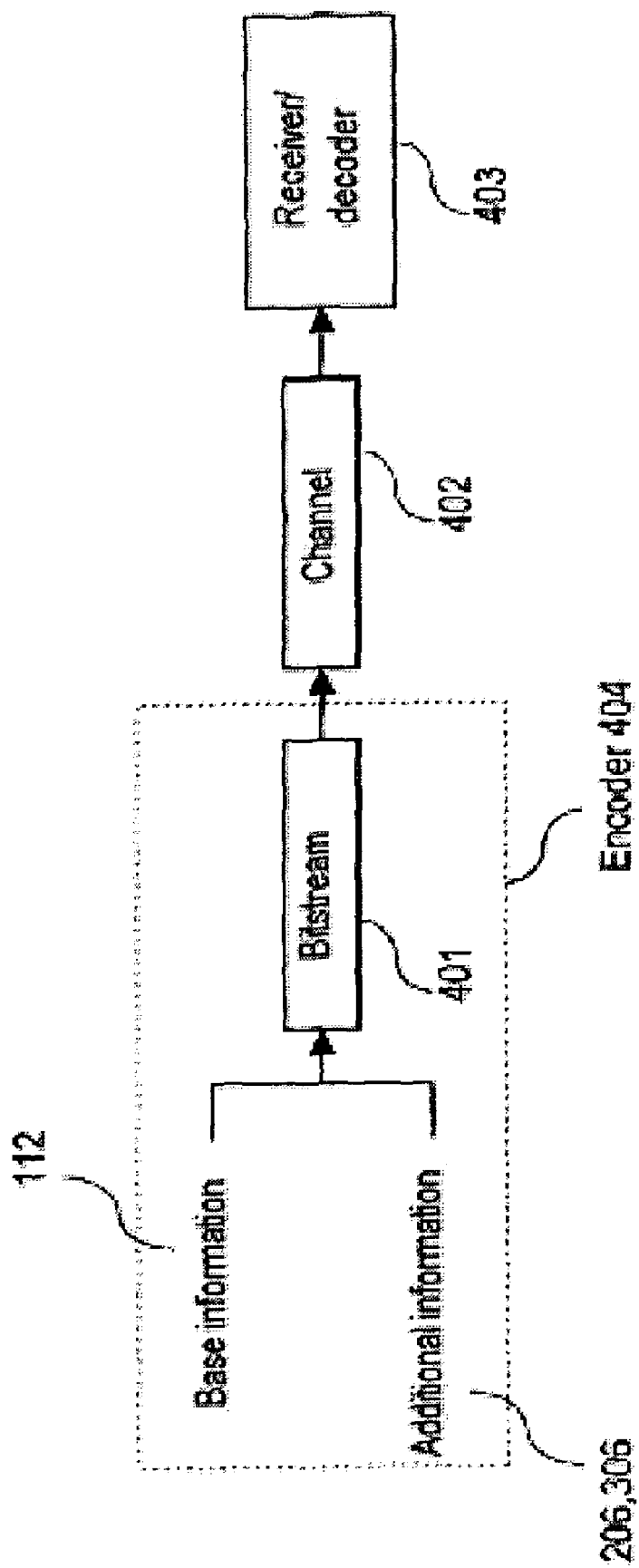
FIG. 4 shows a sketch of a combination of base information and additional information in a bitstream and its transmission via a channel.

FIG. 4 is a sketch showing a combination of the described base information 112 and the additional information (see 206 or 306) in a bitstream 401. This combining takes place at an encoder 404. The bitstream 401 is transmitted via a channel 402 to a receiver or decoder 403. The channel has a preset bandwidth which under certain circumstances is subject to interference, and this bandwidth can itself thus exhibit fluctuations. The aim is now to utilize the bandwidth of the channel as efficiently as possible so that a series of images of the best possible quality can be displayed at the receiver. As part of the bitstream 401, the base information 112 guarantees a certain basic quality which, in principle, arrives largely undisturbed via the channel to the receiver and can be decoded. The resulting quality of the series of images is capable of improvement. This quality improvement is achieved by the additional information added to the bitstream 401 and also transmitted via channel 402 to the receiver or decoder 403. The bitstream represents a series of bits with a specific time window being available, in principle, for each image. If the bandwidth of the channel now fluctuates within this time window, it is entirely possible that not all the data will arrive at the receiver. Therefore, it is necessary to choose carefully what additional information is to be incorporated in the bitstream and in what sequence. For this reason, as explained above, the additional information is arranged such that parts which contribute to a large improvement in the base information are incorporated as early as possible in the bitstream. Furthermore, it is particularly advantageous if the additional information responsible for the quality improvement of the image imparts this quality improvement uniformly to the complete image. This is ensured in that the significant information (i.e., those parts of the residual error information that enable a large improvement), are incorporated uniformly over all blocks of the coded image in the bitstream, so that at the receiver end, depending on how much information can be transmitted within the time window, a uniform improvement for all blocks of the image takes place. For example, the re-sorting of the frequency bands described above is used for this purpose. The aim of the re-sorting of frequency bands is precisely to make sure that firstly all blocks of the image experience a large improvement and then that the quality is gradually further improved. Meanwhile, if the bitstream of the additional information breaks off, an almost optimum improvement of the image up to that time would be achieved and the provided bandwidth thus efficiently utilized.

Figure 5:
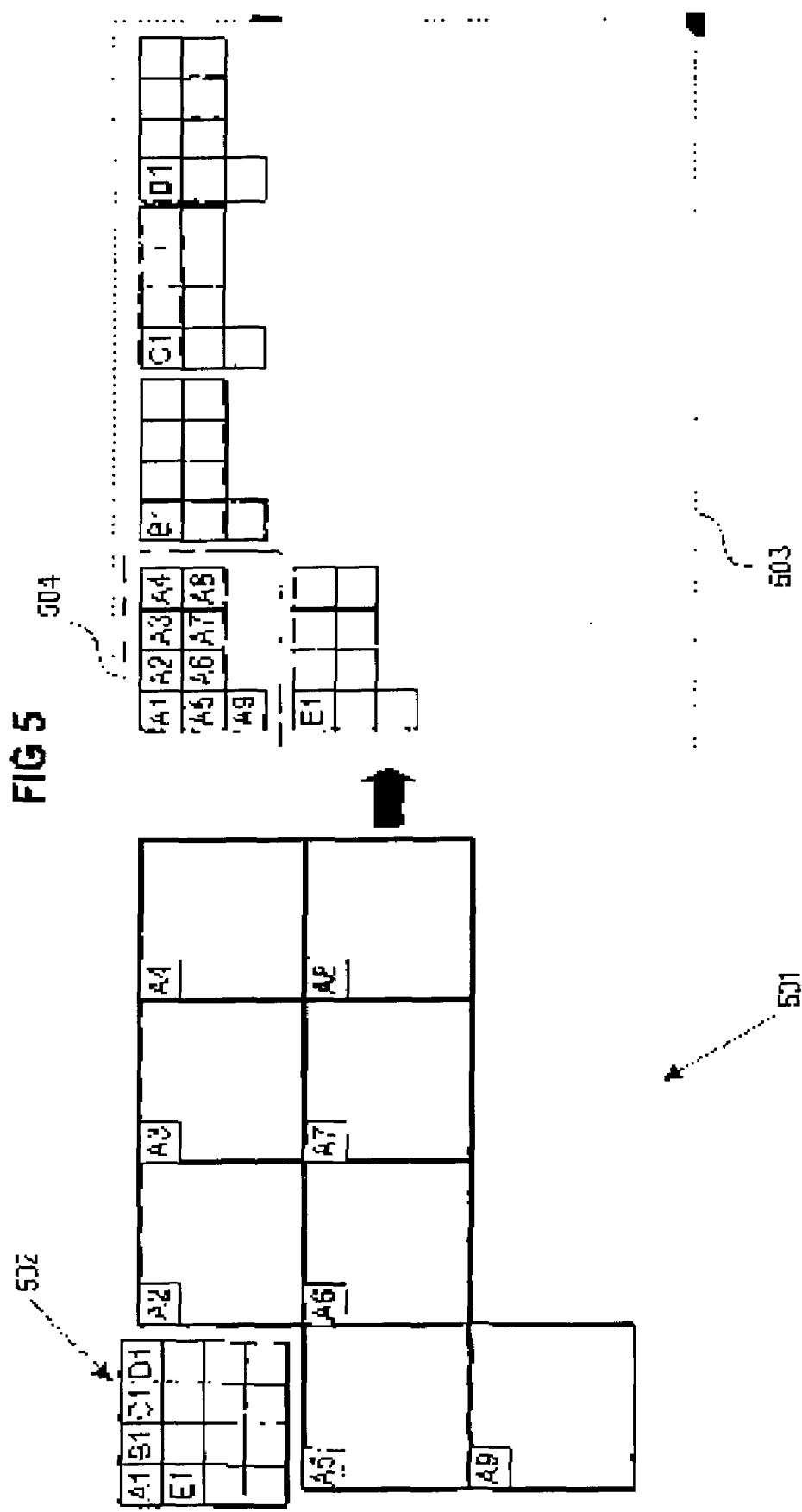
FIG. 5 shows a sketch of a grouping of frequencies or coefficients.

FIG. 5 is a sketch showing the grouping or re-sorting of frequencies (coefficients) described above.

One part 501 shows a section from the transformed image (see 301 in FIG. 3). The image includes several image blocks, including macroblocks, with preferably 8×8 or 16×16 pixels. A macroblock of this kind of 4×4 pixel size, in this case coefficients in the transformation range, is shown as block 502. Block 502 includes several coefficients and one component of the coefficients is shown as the coefficients A1, B1, C1, D1 and E1. The same as with macroblock 502, the succeeding macroblocks are constructed in image 501. The first coefficient A2 to A9 is shown for each macroblock as an example. Preferably, in the case of the first coefficient, it is the direct component that plays a significant role in improving the image. The re-sorting results in a structure as shown in block 503. The transformed image 301 or 501 is re-sorted such that as many subblocks are produced as there are different coefficients. For example, a subblock 504 with all the direct components of all macroblocks of the transformed image 301 or 501 is contained in block 503. The direct components in block 504 are shown as coefficients A1 to A9. By analogy, all the respective similar alternating components B to E are combined in each case.

In this way, a uniform improvement for all macroblocks can be advantageously achieved within the additional information in each case.

Now, as part of the additional information at least for all macroblocks of the image, the direct component, shown as block 504 in FIG. 5, should be transmitted to the receiver. This, in turn, poses the question of how the most efficient improvement can be achieved using the transmitted additional information. Thus, it is particularly disadvantageous to transmit coefficient A1 first in full resolution and the coefficient A2 in full resolution and so on. It is much more advantageous to transmit the significant component of coefficient A1, then the significant component of coefficient A2 and so on. This way it can be ensured that the additional information achieves an improvement efficiently and in good time for all coefficients A1 to A9 (i.e., for all the macroblocks in question), with it being possible to subsequently supply the resolution of the improvement itself in steps. The resolution of the improvement refers to the number of bits which each coefficient has.

Figure 6:
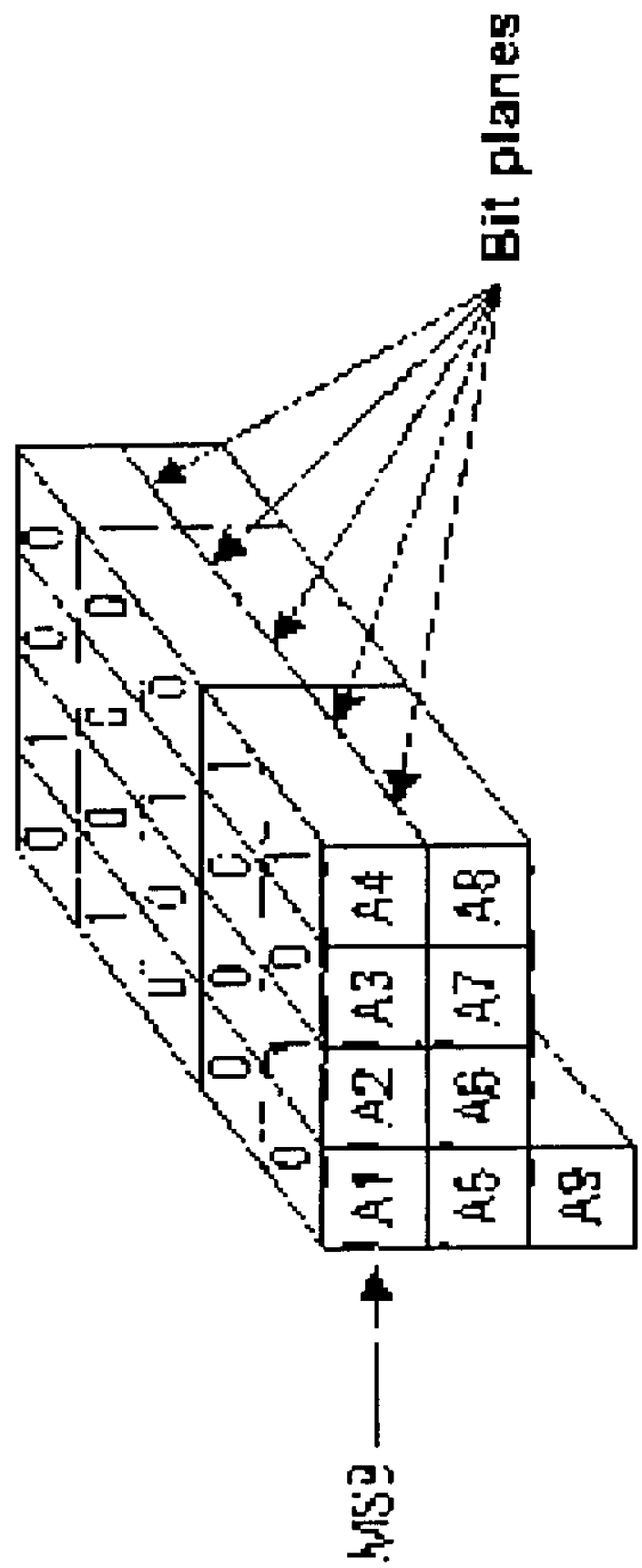
FIG. 6 shows a sketch explaining the bit planes.

This relationship is shown in FIG. 6.

FIG. 6 is a sketch showing the bit planes. Refer also to subblock 504 from FIG. 5 and the associated notes. As described, each coefficient A1 to A9 has a resolution of n bits. In the example given in FIG. 6, n is equal to 6. Thus, there is a most significant bit (MSB) for each coefficient. With regard to an efficient utilization of additional information in the bitstream, it is advantageous if the most significant bit for all coefficients A1 to A9 is transmitted first. The remaining most significant bit is then transmitted and so on.

It should be noted here that coefficients A1 to A9 represent only a section designed to illustrate the procedure for efficiently combining the additional information.

If the bitstream is broken off at a specific point within the additional information to be transmitted, the mechanism described ensures that the additional information already transmitted efficiently improves the image at the decoder end.

A refinement of the described procedure exists in that already within the postprocessing (see blocks 205 and 305) a preparation of the additional information takes place that effects the best possible improvement of the relevant image corresponding to its transmission sequence at the start. Thus, for example, a postprocessing then takes place with regard to an RD (Rate Distortion) optimization in which the additional information is reorganized so that the information that brings about the greatest possible improvement, or that effects the greatest possible reduction in the distortion or residual error, is placed first in the bitstream.

Furthermore, the base information can be used to increase efficiency. For instance, by using different quantizing parameters in a block-based layer coding, insignificant areas can be indicated that can be skipped when coding.

The postprocessing is described in the following.

Re-Sorting of the Residual Error or the Residual Error Information in the Frequency Ranges (Frequency Bands):

Before the actual coding of residual errors, a re-sorting of residual error information in part-bands of equal frequency in each case takes place. Starting from a block-base transformation, the (n, m) transformation coefficients of the i-th block are transmitted to the i-th position of the (n, m) frequency band (see FIG. 5).

Bit Plane Allocation:

A possibility of representing the residual error consists in the explicit allocation of bit planes for a coefficient dependent on the quantizing realized in the base layer; i.e., on the source coding supplying the base information. In this way, the corresponding quantizing interval of the base layer with its margins is reconstructed for further processing for the additional information. The bit planes now result from the ongoing division of the relevant interval into two halves. If a positive original coefficient is located in the left or right part interval, a zero or a one is allocated to the residual error in the current image plane; for negative coefficients the same applies in mirror image.

The maximum number of bit planes, corresponding to the maximum number of interval divisions, is thus specified and the individual number of bit planes then depends on the particular quantizing in the base layer. Coefficients with a coarse quantizing in the base layer receive more bit planes (correspondingly more refinements than coefficients with an already fine quantizing). The knowledge of how many bits per coefficient are to be sent, obtained in this way, also can be used to send refinements later.

When a block-based transformation with a block-dependent (location-dependent) choice of quantizing parameter is used in the base layer, occasioned, for example, by a bit rate check, the concept of bit plane allocation brings about an efficient balance of imbalances within the layer for generation of the additional information (expansion layer). If the quantizing parameters for the individual macroblocks fluctuate heavily within an image, these fluctuations are reduced with each transmitted bit plane in the expansion layer and thus promote a uniform (taking account of the base information and additional information) quantizing, which is reflected in the uniform quality at the decoder end.

The coefficients are reconstructed relative to the information decoded in the expansion layer. Starting from the initial quantizing interval of the base layer, this interval is refined as often as the bits for the coefficients were decoded. This is followed by the allocation of a reconstruction value within the resulting interval; for example, by the interval mid-point.

A further advantage of representing the residual error through the method of bit plane allocation described above is that the sign information is sent only for the coefficients that become significant for the first time in the expansion layer.

Residual Error Representation Using Reference Residues:

In addition to the explicit calculation of the residue between original and reconstruction, the forming of a differential between a (fictitious) reference value of a reconstructed coefficient of the base layer and the associated original coefficient is a further possibility of representing residual errors. In this case, the use of a reference value, which for positive coefficients is placed on the left edge, and for negative coefficients on the right edge, of the quantizing interval of the base layer means that no unnecessary sign information has to be sent. Furthermore, for each part-band, the bit plane in which a part-band coefficient is significant for the first time should be identified (most significant bit plan), to avoid unnecessary coding of zero planes.

Part-Band Based Coding Techniques for the Expansion Layer

1. Significance or Refinement Information

The coding distinguishes between two states, the significance and refinement state, for each coefficient. For this, a coefficient is in the significance state as long as there is no significant information for it present; i.e., in the event of a reconstruction the coefficient would be mapped on the zero. The indication of its significance is awaited, with a coefficient being significant in the k-th bit plane when its amplitude a is in the range $$2^k \leq |a| < 2^{k+1}$$

If a "1" is sent the first time, the coefficient then changes its state after the coding of this "1," it passes into the refinement state and all the following bits are designated as refining bits.

The current state of the coefficients is described with the aid of a binary value significance matrix. This is continuously updated. A "1" in the matrix indicates that the coefficient has already indicated its significance and is thus in the refinement state. A zero corresponds to the significance state; i.e., the significance is still awaited for the coefficient.

On the basis of the significance matrix, the decision is made as to in which run (fractal bit plane) and with what routine a bit currently to be coded is to be processed. The significance matrix is immediately updated after the coding of a bit.

Because the coding in the expansion layer concerns a residual error, it is important to use as much information from the base layer as possible for the purposes of coding. Thus, for example, it is appropriate to initialize the significance matrix at the beginning of coding in the expansion layer using the significance information from the base layer.

2. Coding Tools

Depending on the environment of a coefficient and its state, different routines are used to code the current bit. What is common to all the routines is that they use an adaptive arithmetical coding of the binary symbols, with context generation supporting the efficiency of the routines in a suitable manner.

Significance Routine

The significance information is coded using context generation in which the significance states from the immediate environment of the particular coefficient to be currently coordinated are included.

Sign Routine

When coding the sign information, contexts consisting of the sign information of the immediate environment of the coefficient to be currently coded are used. This routine is, however, only called up the first time a coefficient indicates its significance. Routines for combining insignificant zeros Zero trees or run lengths can be used for efficient coding of the significance information in significant remaining zeros of a bit plane.

Refining Routine

The coding of refining bits takes place in the upper bit planes, after the first occurrence of the significance, with a context generation which includes the significance states of the neighboring coefficients; only an adaptive model is used in the bit planes below this.

3. Concept of the Fractal Bit Plane

Conventional bit plane coders code the bits of a bit plane in succession using suitable routines in one run. The idea of the fractal bit plane is to scan the bit plane currently to be coded in several runs and to allocate the bits to a fractal bit plane according to their state and environment.

The basic scanning arrangement within a band is thus subject to a certain priority (priority before location). Information, from which it is anticipated that the optimum influence on the RD (Rate Distortion) function will be greater, is to be sent first. Only by this concept is it possible, including within a bit plane, to find optimum RD cut-off points and thus increase the granularity.

At least three runs per bit plane are advantageous.

The first run of bit plane codes significance information only under the condition that the coefficient is in a significant environment.

In the second run, the pure refining information is coded, while in the third run the remaining, still missing, significance information is coded. The particular coding routines, as described above, are allocated to all three runs.

Alternatively, the last two runs also could be performed in reverse sequence.

4. Processing Sequence of Single Part-Bands or Components.

If no facility for subsequent RD optimization within the postprocessing 205 or 305 is provided, it is necessary to specify a processing sequence of individual bands or components and thus the position of their corresponding component in the bitstream. The zigzag scan can be regarded as suitable for the band arrangement.

Subsequent Rate Distortion Optimization (Postprocessing)

A further tool to increase efficiency is the subsequent rate distortion optimizing. Subsequent in this case refers to individual code segments being rearranged in the bitstream after the actual coding. This concept requires that the bitstream be capable of being divided into code segments (by an independent coding) and that information on the rate distortion characteristics of the individual segments exists. In this case, the size of the code segments influences the fineness of the scalability.

Figure 7:
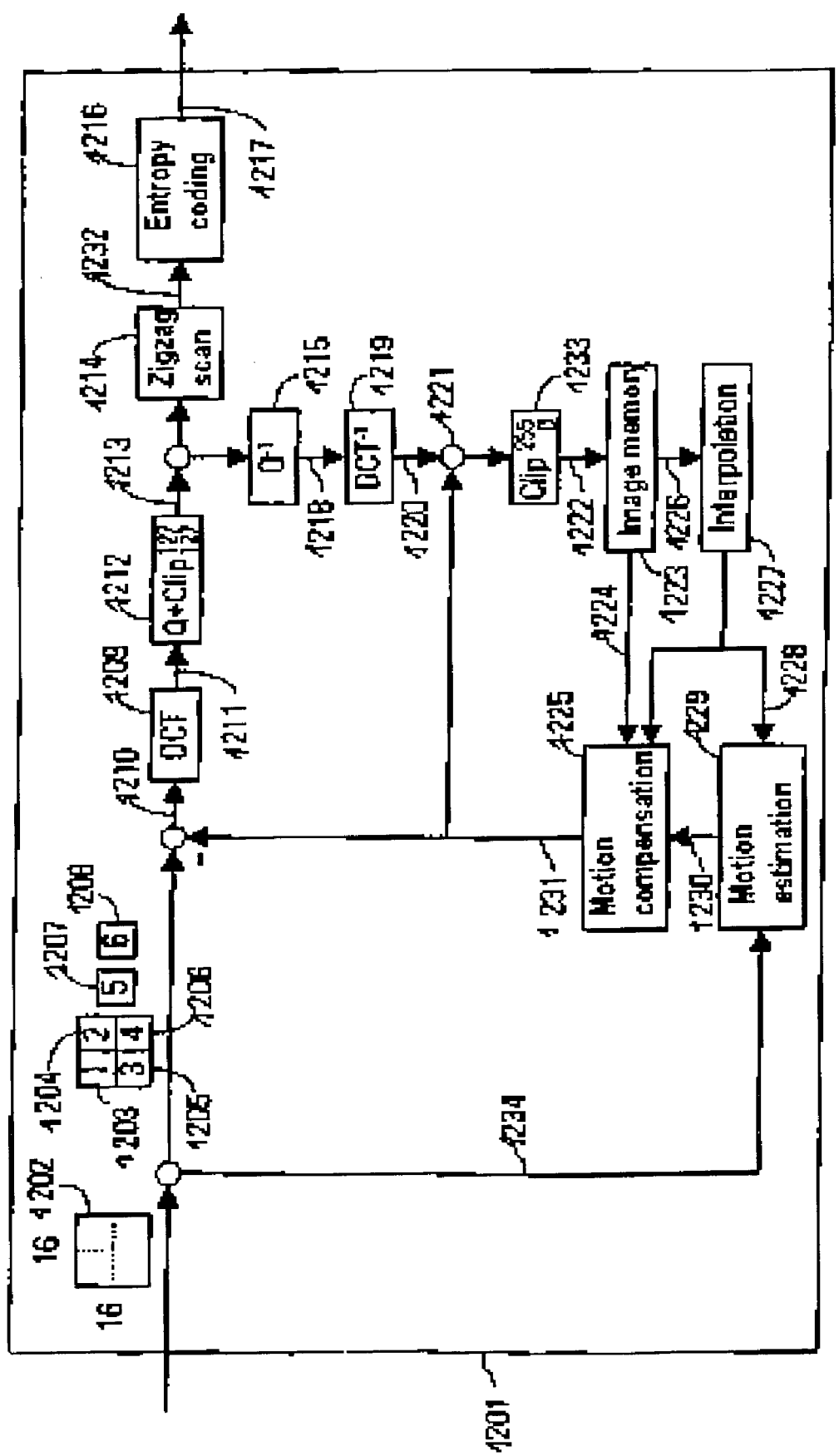
FIG. 7 shows a sketch with an image coder and an image decoder.

FIG. 7 is a sketch showing an arrangement for performing a block-based image coding process.

A video data stream to be coded with digitized images in a time sequence is supplied to an image coding unit 1201. The digitized images are divided into macroblocks 1202, with each macroblock having 16×16 pixels. Macroblock 1202 contains four image blocks 1203, 1204, 1205 and 1206, with each image block containing 8×8 pixels to which luminance values (luminosity values) are allocated. Furthermore, each macroblock 1202 contains two chrominance blocks 1207 and 1208 with chrominance values allocated to the pixels (color difference values).

Alternatively, the image blocks can be 4×4 pixels in size. Accordingly, the macroblocks contain 16 image blocks. This is preferably used in the H.26L test model.

The image blocks are supplied to a transformation coding unit 1209. With a differential image coding the values to be coded of image blocks of chronologically previous images are subtracted from the image blocks to be currently coded, only the differential generation information 1210 of the transformation coding unit (DCT) 1209 is applied. To do this, the current macroblock 1202 of a motion estimation unit 1229 is communicated via a connection 1234. In the transformation coding unit 1209, spectral coefficients 1211 are generated for the image blocks or differential image blocks to be coded and applied to a quantizing unit 1212.

Quantized spectral coefficients 1213 are applied both to a scanning unit 1214 and to an inverse quantizing unit 1215 in a reverse path. After a scanning process, such as a zigzag scanning process, an entropy coding on the scanned spectral coefficients 1232 is carried out in an entropy coding unit 1216 provided for the purpose. The entropy-coded spectral coefficients are transmitted as coded image data 1217 via a channel, preferably a line or a radio link, to a decoder.

An inverse quantizing of the quantized spectral coefficients 1213 takes place in the inverse quantizing unit 1215. Spectral coefficients 1218 obtained in this way are applied to an inverse transformation coding unit 1219 (inverse discrete cosine transform, IDCT).

Reconstructed coding values (including differential coding values) 1220 are applied in the differential image mode to an adder 1221. The adder 1221 also contains coding values of an image block, which result from a chronologically previous image after an already-performed motion compensation. Via the adder 1221, reconstructed image blocks 1222 are generated and stored in an image memory 1223.

Chrominance values 1224 of the reconstructed image blocks 1222 are applied from the image memory 1223 to a motion compensation unit 1225. An interpolation in an interpolation unit 1227, provided for the purpose, takes place for luminosity values 1226. Via the interpolation, the number of luminosity values held in the particular image block is preferably doubled. All luminosity values 1228 are applied both to the motion compensation unit 1225 and the motion estimation unit 1229. The motion estimation unit 1229 also receives, via connection 1234, the image blocks of the particular macroblocks (16×16 pixels) to be coded. The motion estimation takes place in the motion estimation unit 1229, taking account of the interpolated luminosity values ("motion estimation on half-pixel basis"). Preferably, absolute differences in individual luminosity values in the macroblock to be currently coded 1202 and the reconstructed macroblock are determined from the chronologically previous image during the motion estimation.

The result of the motion estimation is a motion vector 1230, via which a local displacement of the selected macroblock from the chronologically previous image to the macroblock to be coded 1202 is expressed.

Both luminosity information and chrominance information relative to the macroblock determined by the motion estimation unit 1229 is displaced by the motion vector 1230 and subtracted from the coding values of the macroblock 1202 (see data path 1231).

Figure 8:
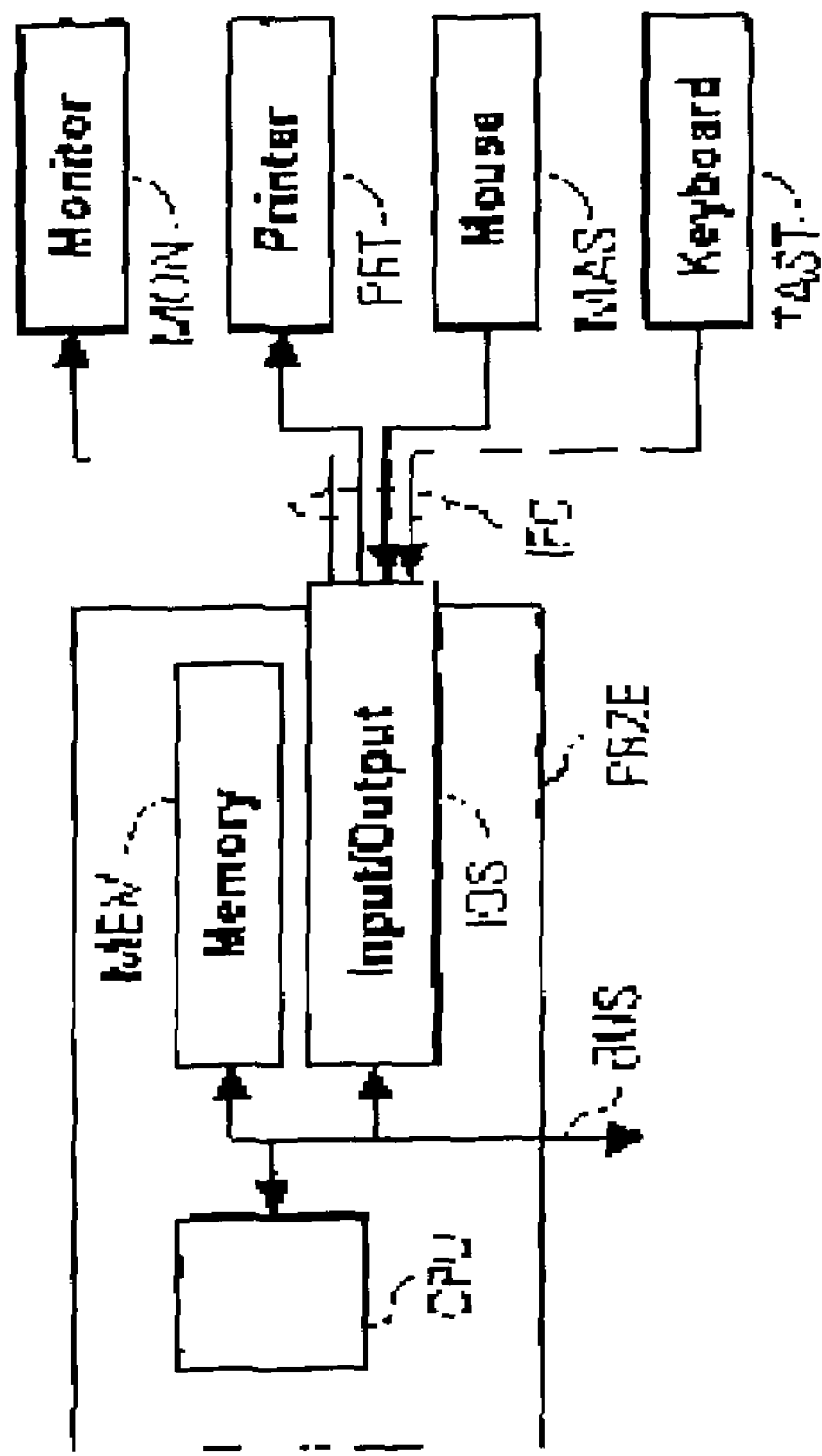
FIG. 8 shows a processor unit

FIG. 8 shows a processor unit PRZE. This processor unit PRZE contains a processor CPU, a memory MEM and an input/output interface IOS, which is used via an interface IFC in a variety of ways; e.g., an output is sent via a graphic interface to a monitor MON and/or to a printer PRT. Input is via a mouse MAS or keyboard TAST. The processor unit PRZE also has a data bus which links a memory MEM, the processor CPU and the input/output interface IOS. Additional components also can be connected to the data bus BUS; e.g., additional memories, data storage devices (hard disks) or scanners.

Although the present invention has been described with reference to specific embodiments, those of skill in the art will recognize that changes may be made thereto without departing from the spirit and scope of the present invention as set forth in the hereafter appended claims.

REFERENCES

[1] J. De Lameillieure, R. Schäfer: "MPEG-2-Bildcodierung für das digitale Fernsehen" [MPEP-2 image coding for digital television], Fernseh- und Kino-Technik, $48^{th}$ year, No. 3/1994, pages 99–107.
[2] M. Bierling: "Displacement Estimation by Hierarchical Blockmatching," SPIE, Vol. 1001, Visual Communications and Image Processing '88, p. 942–951, 1988.

The invention claimed is:

1. A method for coding a series of images, the method comprising the steps of:
   determining base information for the series of images using a method for source coding, with residual error information being produced during the source coding, between the series of images and a coded series of images;
   generating additional information for the series of images for a gradual representation of the residual error information, with the residual error information being subdivided into frequency ranges and gradually scaled; and
   coding the series of images using the base information and the additional information, with the additional information guaranteeing a progressive improvement in coding quality; and
   transmitting the series of images to a receiver via a channel as a bitstream, wherein the subdivision of the frequency ranges is effected such that the additional information for each image in the series of images is transmitted according to its significance.

2. A method for coding a series of images as claimed in claim 1, wherein the channel is subject to interference.

3. A method for coding a series of images as claimed in claim 1, wherein the residual error information is determined from one image in the series of images and a quantized image in the series of images in an image area.

4. A method for coding a series of images as claimed in claim 1, wherein the residual error information is determined from one image in the series of images and a quantized image in the series of images in a transformation area.

5. A method for coding a series of images as claimed in claim 1, wherein the method for source coding is a standardized image coding method.

6. A method for coding a series of images as claimed in claim 5, wherein the standardized image coding method is a method according to an MPEG standard.

7. A method for coding a series of images as claimed in claim 5, wherein the standardized image coding method is a method according to an H.26x standard.

8. A method for coding a series of images as claimed in claim 1, wherein the base information is taken into account when determining the additional information.

9. A method for coding a series of images as claimed in claim 1, wherein each image in the series of images is restored using the base information and the additional information.

10. A method for coding a series of images, the method comprising the steps of:
    determining base information for the series of images using a method for source coding, with residual error information being produced during the source coding, between the series of images and a coded series of images;

generating additional information for the series of images for a gradual representation of the residual error information, with the residual error information being subdivided into frequency ranges and gradually scaled;

coding the series of images using the base information and the additional information, with the additional information guaranteeing a progressive improvement in coding quality; and transmitting the series of images to a receiver via a channel as a bitstream, wherein, over a specified set of values of positional information, most significant bits in each case are input into the bitstream iteratively for all the values in the set.

11. A method for coding a series of images, the method comprising the steps of:

determining base information for the series of images using a method for source coding, with residual error information being produced during the source coding, between the series of images and a coded series of images;

generating additional information for the series of images for a gradual representation of the residual error information, with the residual error information being subdivided into frequency ranges and gradually scaled;

coding the series of images using the base information and the additional information, with the additional information guaranteeing a progressive improvement in coding quality; and transmitting the series of images to a receiver via a channel as a bitstream, wherein, as additional information, the largest residual error information is transmitted first.

12. A system for coding a series of images, comprising a processor unit for effecting the steps of determining base information for the series of images using a method for source coding, with residual error information being produced during the source coding, between the series of images and a coded series of images, generating additional information for the series of images for a gradual representation of residual error information, with the residual error information being subdivided into frequency ranges and gradually scaled, coding the series of images using the base information and the additional information, with the additional information guaranteeing a progressive improvement in coding quality, and transmitting the series of images to a receiver via a channel as a bitstream, wherein the subdivision of the frequency ranges is effected such that the additional information for each image in the series of images is transmitted according to its significance.

13. A system for coding a series of images as claimed in claim 12, wherein the processor unit further effects the step of restoring each image in the series of images using the base information and the additional information.

14. A system for coding a series of images, comprising a processor unit for effecting the steps of determining base information for the series of images using a method for source coding, with residual error information being produced during the source coding, between the series of images and a coded series of images, generating additional information for the series of images for a gradual representation of residual error information, with the residual error information being subdivided into frequency ranges and gradually scaled, coding the series of images using the base information and the additional information, with the additional information guaranteeing a progressive improvement in coding quality, and transmitting the series of images to a receiver via a channel as a bitstream, wherein over a specified set of values of positional information, most significant bits in each case are input into the bitstream iteratively for all the values in the set.

15. A system for coding a series of images, comprising a processor unit for effecting the steps of determining base information for the series of images using a method for source coding, with residual error information being produced during the source coding, between the series of images and a coded series of images, generating additional information for the series of images for a gradual representation of residual error information, with the residual error information being subdivided into frequency ranges and gradually scaled, coding the series of images using the base information and the additional information, with the additional information guaranteeing a progressive improvement in coding quality, and transmitting the series of images to a receiver via a channel as a bitstream, wherein, as additional information, the largest residual error information is transmitted first.

16. A method of generating a bitstream representing a coded series of images, the method comprising:

determining base information for the series of images using a method for source coding, with residual error information being produced during the source coding, between the series of images and a coded series of images;

generating additional information for the series of images for a gradual representation of the residual error information, with the residual error information being subdivided into frequency ranges and gradually scaled; and coding the series of images using the base information and the additional information, with the additional information guaranteeing a progressive improvement in coding quality;

generating a bitstream using the coded series of images; and transmitting the series of images to a receiver via a channel as the bitstream, wherein the subdivision of the frequency ranges is effected such that the additional information for each image in the series of images is transmitted according to its significance.

17. A method of generating a bitstream representing a coded series of images, the method comprising:

determining base information for the series of images using a method for source coding, with residual error information being produced during the source coding, between the series of images and a coded series of images;

generating additional information for the series of images for a gradual representation of the residual error information, with the residual error information being subdivided into frequency ranges and gradually scaled; and coding the series of images using the base information and the additional information, with the additional information guaranteeing a progressive improvement in coding quality;

generating a bitstream using the coded series of images; and transmitting the series of images to a receiver via a channel as the bitstream, wherein, over a specified set of values of positional information, most significant bits in each case are input into the bitstream iteratively for all the values in the set.

18. A method of generating a bitstream representing a coded series of images, the method comprising:

determining base information for the series of images using a method for source coding, with residual error information being produced during the source coding, between the series of images and a coded series of images;

generating additional information for the series of images for a gradual representation of the residual error information, with the residual error information being subdivided into frequency ranges and gradually scaled; and coding the series of images using the base information and the additional information, with the additional information guaranteeing a progressive improvement in coding quality;

generating a bitstream using the coded series of images; and transmitting the series of images to a receiver via a channel as the bitstream, wherein, as additional information, the largest residual error information is transmitted first.

* * * * *